United States Patent [19]

Froelich

[11] Patent Number: 4,690,554

[45] Date of Patent: Sep. 1, 1987

[54] FINGERPRINT IDENTIFICATION DEVICE

[76] Inventor: Ronald W. Froelich, 2405 N. Cameron Ave., Covina, Calif. 91724

[21] Appl. No.: 936,169

[22] Filed: Dec. 1, 1986

[51] Int. Cl.$^4$ .......................... G06K 9/20; G06K 9/74; G02B 26/10

[52] U.S. Cl. ....................................... 356/71; 350/6.8; 356/394; 356/398; 382/4

[58] Field of Search .......................... 356/71, 394, 398; 350/6.8; 382/4

[56] References Cited

U.S. PATENT DOCUMENTS

| | | | |
|---|---|---|---|
| 2,222,937 | 11/1940 | Dimmick | 178/7.6 |
| 3,771,850 | 11/1973 | Casler | 350/6 |
| 3,804,485 | 4/1974 | Clarke | 350/7 |
| 3,928,842 | 12/1975 | Green et al. | 340/146.3 |
| 4,041,322 | 8/1977 | Hayosh et al. | 250/568 |
| 4,129,355 | 12/1978 | Noguchi | 350/6.7 |
| 4,266,252 | 5/1981 | Cox et al. | 358/293 |
| 4,318,582 | 3/1982 | Minoura et al. | 350/6.6 |
| 4,329,012 | 5/1982 | Minoura et al. | 350/6.8 |

*Primary Examiner*—Vincent P. McGraw
*Attorney, Agent, or Firm*—Robert Louis Finkel

[57] ABSTRACT

A device employing the optical autocorrelation method for automatically comparing the fingerprint of an individual with a previously identified exemplar utilizes a pair of multifaceted mirrors rotating about mutually perpendicular axes to sweep an image of the fingerprint over the surface of the exemplar in a raster. To maintain the image in focus, a pair of independent identical relay lens systems are positioned in the light path and arranged symmetrically with respect to a common intermediate image plane. The mirrors are positioned so that as they rotate their reflective facets coincide successively with the aperture stop locations of the respective lens system. To compensate for possible angular misalignment of the fingerprint and the exemplar, novel independent optical means are provided for effectively rotating the image about the principal axis of the light path.

10 Claims, 9 Drawing Figures

FIG. 7
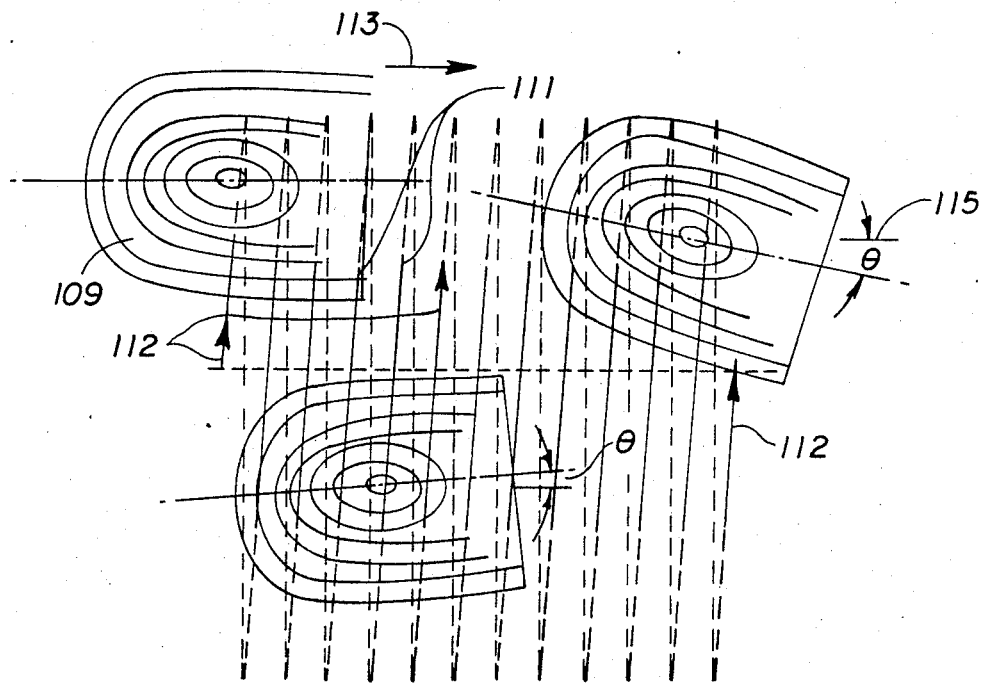
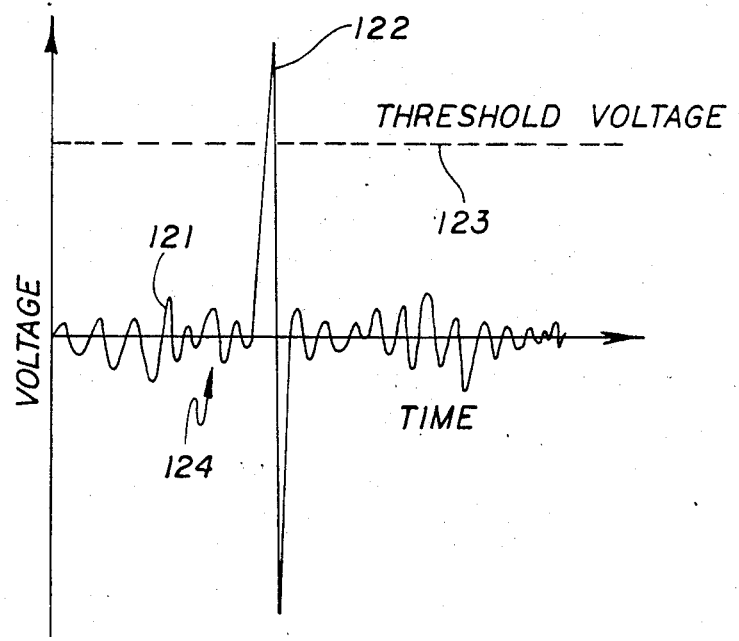
FIG. 8

FINGERPRINT IDENTIFICATION DEVICE

BACKGROUND OF THE INVENTION

1. Field of the Invention

This invention relates to automatic electro-optical devices for identifying fingerprints, and especially to devices of the type in which the incoherent optical image of a latent fingerprint is superimposed over a known fingerprint for comparison. More particularly, it contemplates a fingerprint identification device incorporating a method and means for rapidly sweeping an optically projected image of a latent print in a repetitive pattern across a surface containing a previously identified print and sensing the marked change in reflected or transmitted radiance which occurs when the features of identical prints coincide.

2. Prior Art

Once limited almost exclusively to the fields of criminal investigation and law enforcement, with the advent of automated fingerprint identification systems the use of fingerprints for personal indentification is now being extended to a broad range of applications. The ability to establish or confirm an individual's identity quickly and with near certainty readily lends itself to such purposes as access control, transaction approval in banking, mercantile and other commercial operations and record processing in the administration and delivery of health and welfare services.

For the most part, current fingerprint identification systems are of three basic types. One utilizes means such as a scanning electron beam to sense and encode the minutiae and other characteristics of the print to be identified. Converted to digital form, compressed and stored, the encoded data are processed by computor for comparison with similar data taken from previously identified prints. Devices of this type are expensive, and for a variety of reasons do not provide the accuracy, dependability, or utility required for the uses envisioned.

In the second type, the latent print to be identified is converted into a hologram, diffraction image, Fourier transform, or other analog representation, generally using coherent light techniques, for optical or digital correlation with a known print. These devices are no more accurate or reliable than those of the first type, and, at their present stage of development, most of them are far too sensitive to a variety of external influences to be of use in other than a laboratory environment.

The third type of identification system, exemplified by U.S. Pat. No. 3,928,842, employs a source of intense incoherent light and optical projection means, including an image forming lens system, to superimpose the image of a latent print on a known print. The radiance reflected or transmitted by the two fingerprint patterns is sensed to provide an indication of their correlation.

To insure the registration of any identical features which may reside in the two patterns, means are provided for sweeping the optically projected image of the latent print across the exemplary print in a repetitive raster. Typically, the image is deflected by a pair of mirrors positioned in the optical path and mounted for simultaneous limited oscillating rotation about mutually perpendicular axes. One mirror oscillates at a relatively slow rate to produce reciprocating movement of the image along a first axis in the plane of the print. The other moves at a much higher rate and produces reciprocating movement of the image along a second axis perpendicular to the first. The pattern traced by the image is designed to assure that if the prints are the same, their features will coincide at some point during the scan.

To compensate for possible angular misalignment of the two prints, independent means are provided for effectively rotating either the image or the entire sweep pattern with respect to the known print during the comparison cycle.

The optical autocorrelation technique on which such systems are based is generally considered to afford the highest degree of accuracy available with any type of pattern-matching system, and of the three types of systems mentioned, this one appears to have the greatest potential for widespread use.

Presently, however, devices of this type suffer from a number of disadvantages. Chief among these are their susceptability to a variety of influences which adversely affect their accuracy and reliability, their relatively slow speed of operation, and their considerable size. Of secondary, but nonetheless significant importance, they are costly to manufacture, and demand considerable maintenance. All of these deficiencies can be traced to the conventional prior art approach to fingerprint comparator design.

The ability of the optical autocorrelation method to discriminate between matching and non-matching fingerprints depends heavily on the sharpness of the image and its congruence with the exemplar print. Precise control over the focus and magnification of the image are critical. In accordance with prior art convention, as illustrated by U.S. Pat. No. 3,928,842, existing autocorrelation-type comparators are designed to employ a single optical lens system for this function. Previously there was no reason to consider using more than one lens system. Furthermore, the cost of the highly corrective optical elements required for such systems inveighed strongly against the use of a second set of lenses.

Practical considerations mandate that the one lens system used be as fast as practicable. Necessarily, such a system has very limited depth of field. As a consequence, even small variations in focal distance result in unacceptable changes in the clarity and size of the image. Prior art comparators are thus extremely sensitive to thermal deformation, mechanical displacement, optical misalignment, and any other factor which may affect the length of the image path.

In a focused image-scanning optical system, all of the light-deflecting elements used to generate the image scan pattern are required to be located between the lens and the image. Because of this requirement, another consequence of the use of only one optical lens system in the prior art comparator is that all of the image-sweeping components and their associated support structures and drive mechanisms must be positioned at one end of the lens system. Since there is only one stop in the optical system, no other arrangement is possible. This configuration results in the optical train taking up a considerable amount of space.

Additionally, because of structural restrictions imposed by the previously mentioned sensitivity of the overall system to variations in focal distance, the need to have all of the image-deflecting apparatus on one side of the lens system places severe limitations on the kinds of image-deflecting devices which can be employed for generating the sweep pattern and, in turn, on the operating speed of the comparator.

Heretofore, a resonant electromechanical torque drive, such as a conventional galvanometer, was considered to be the fastest device capable of deflecting the optically projected image without introducing substantial changes in the length of the image path, and corresponding changes in the focus and size of the image. Based on this belief, prior art comparators commonly employ a mirror mounted to a galvanometer to produce one of the two image-sweeping sweeping motions.

In using a torque drive, to maintain a fixed image path length the axis of rotation of the drive must be located as close as possible to the plane of the reflective surface. Although galvanometers capable of oscillating at very high rates are available, since the mass of the mirror and the supporting structure needed to satisfy this requirement are appreciable, in practice galvanometers producing on the order of only about 120 sweep cycles/second are used.

In light of the fact that the rapid sweep is the operational component of the optical system which effectively determines the time required for the image to complete one full sweep raster, the use of a relatively slow oscillating torque drive results in an undesirably long fingerprint comparison duty cycle. Fingerprint identification devices currently on the market generally require at least six seconds to make a positive identification. Clearly, faster image-deflecting means are called for.

One such means, the rotating multi-faceted mirror or "reflecting polygon", is well known. However, it does not lend itself to use in comparators of prior art design. Since the polygon's flat reflective surfaces travel circumfrentially around the polygon's axis of rotation, their passage through the optical path results in radical changes in the focal distance traversed by the image. Mirrors of this type have seen wide use, singly and in pairs, in projection systems for scanning lines or narrow, unfocused light beams, but I am aware of no application in which one, much less two of them has been employed in any system for projecting a focused image in a two-dimensional raster. I have devised such a system.

SUMMARY OF THE INVENTION

In my invention I utilize a pair of similar multifaceted polygons, rotating about mutually perpendicular axes, to sweep the focused fingerprint image in a dense pattern covering the known fingerprint. To accomplish this I employ a pair of identical self-correcting relay lens systems arranged symetrically about a common intermediate image plane so that the overall reduction ratio from object to image plans is 1:1. The chief light rays at the intermediate image plane are telecentric, so that a field lens is not required to feed one relay into the other.

The optical projection system possesses two aperture stop locations. With such a configuration it is possible to position a reflective surface at each of the stop location planes and have that surface function as the stop for its associated lens system.

When such reflective surfaces are effectively rotated at the stop locations, they provide a complete sweep or deflection of the entire image field.

To achieve this result, I position the axis of rotation of each polygon so that as it rotates each of its facets coincides, in turn, with the aperture stop location of the adjacent lens system. As each facet passes through the aperture stop location it undergoes rotation in the plane of rotation of the polygon. In actuality the axis of rotation of the reflecting surface is in constant motion with respect to the light path. To prevent such motion from adversely affecting the sharpness of the image, I construct the polygon with an adequate diameter and number of reflecting surfaces to insure that the reflecting surface remains close to the aperture stop location at all times.

To compensate for angular misalignment of the fingerprints, I have developed a novel optical subsystem employing a pair of spaced opposed fixed mirrors ganged together in a supporting yoke. The first of the mirrors deflects the incoming image of the latent print into the second mirror which in turn reflects it in an outgoing direction parallel with but opposite to the incoming light path. The yoke is mounted for rotation about an axis located at the midpoint of the distance separating the mirrors and oriented parallel with the two light paths. Oscillating rotational motion is imparted to the yoke by means of a motor-driven cam and opposing tension spring. Through this arrangement rotary motion within the optical path is imparted to the latent print image.

While the three-axis scanning system I have described is adaptable to a variety of applications, the principal object of my invention is to employ the system in a novel device for identifying fingerprints.

Another object is the provision of a unique optical system for projecting a focused image onto a surface in a repeating scan pattern.

Still another object is the provision of such a device having extremely stable image focusing capability.

Yet another object is the provision of a unique optical projection system which utilizes a pair of multifaceted rotating mirrors for deflecting an image in two axes.

A further object is the provision in an optical projection system of novel optical means for effectively rotating the image within the image path.

A still further object is the provision of a compact, sturdy, extremely accurate and reliable automatic fingerprint identification device employing the optical autocorrelation method for comparing and matching fingerprint patterns.

Yet a further object is the provision of a device of this type having a duty cycle substantially shorter than any similar prior art fingerprint comparator, and preferrably requiring on the order of one second to determine whether a pair of prints match or not.

Yet still another object is the provision of such a fingerprint identification device which is relatively inexpensive to manufacture and requires little maintenance in the field.

Additional objects and features of the invention, and its operation will become apparent to the reader from the following detailed description of the preferred embodiment illustrated in the accompanying set of drawings.

DESCRIPTION OF THE DRAWINGS

In the drawings:

FIG. 7 is a graphic depiction of a fanciful sweep raster generated by the optical projection system of the subject invention;

FIG. 8 is a graphic depiction of a fanciful electrical output signal indicating matching print features.

DETAILED DESCRIPTION OF THE INVENTION

Figure 1:
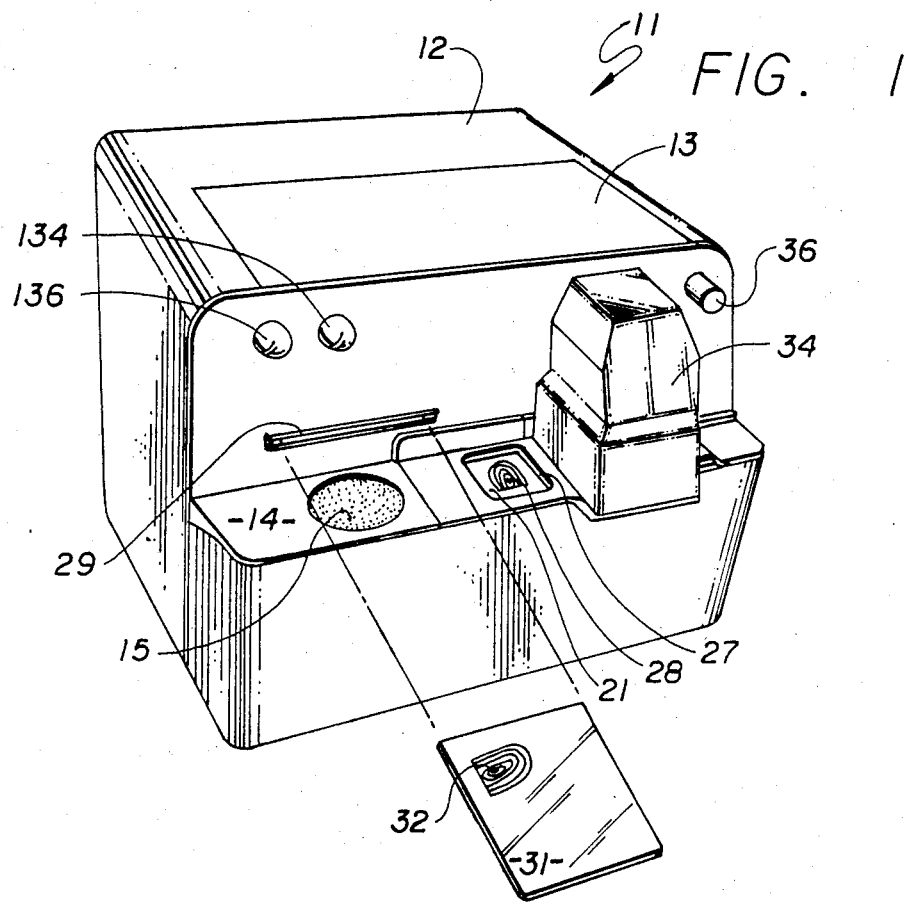
FIG. 1 is a perspective view of a fingerprint identification device embodying the subject invention.

Although the invention can be adapted for use in a variety of situations and configurations, the embodiment illustrated here is intended to be used for confirming the identity of an individual who is present at a location, for example at a bank teller's window or the checkout stand in a market. Referring now to FIG. 1, a typical fingerprint identification device 11 embodying my invention is housed in a cabinet having a chassis (not shown) to which is mounted a removeable cover 12. The cover 12 may be provided with a removeable or hinged panel 13 adapted to afford access for maintenance or such minor adjustments as may be necessary from time to time.

For convenience in obtaining a fingerprint from the individual to be identified, a shelf 14 at the front of the cabinet contains an absorptive pad 15 saturated with an inkless solution containing a chelating agent or other suitable activator for producing sharp, high-contrast fingerprints on treated paper. Such solutions and sensitized papers are well known and form no part of this invention.

Figure 2:
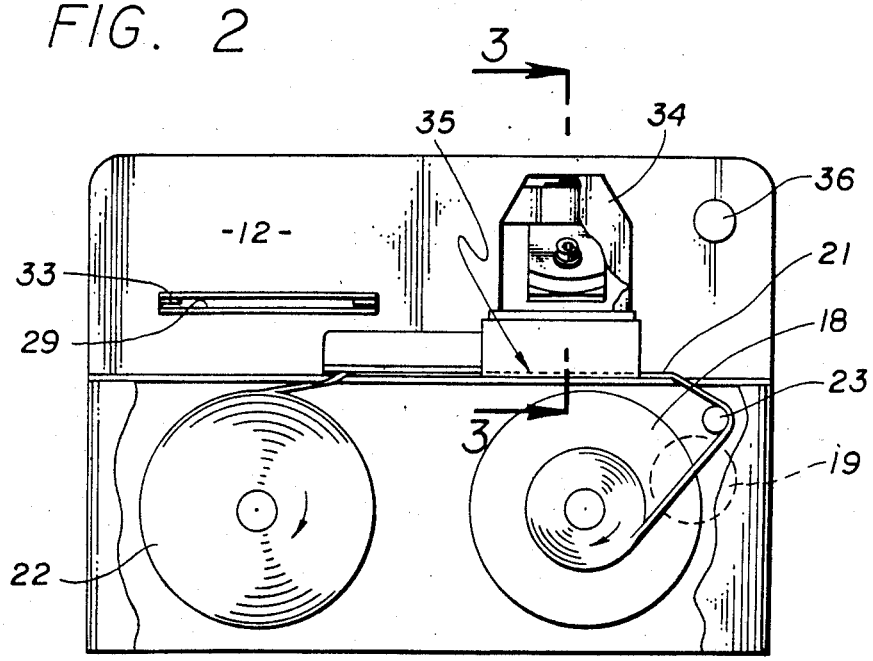
FIG. 2 is a front elevational view of the device illustrated in FIG. 1, partially fragmented to disclose its internal construction.
Figure 3:
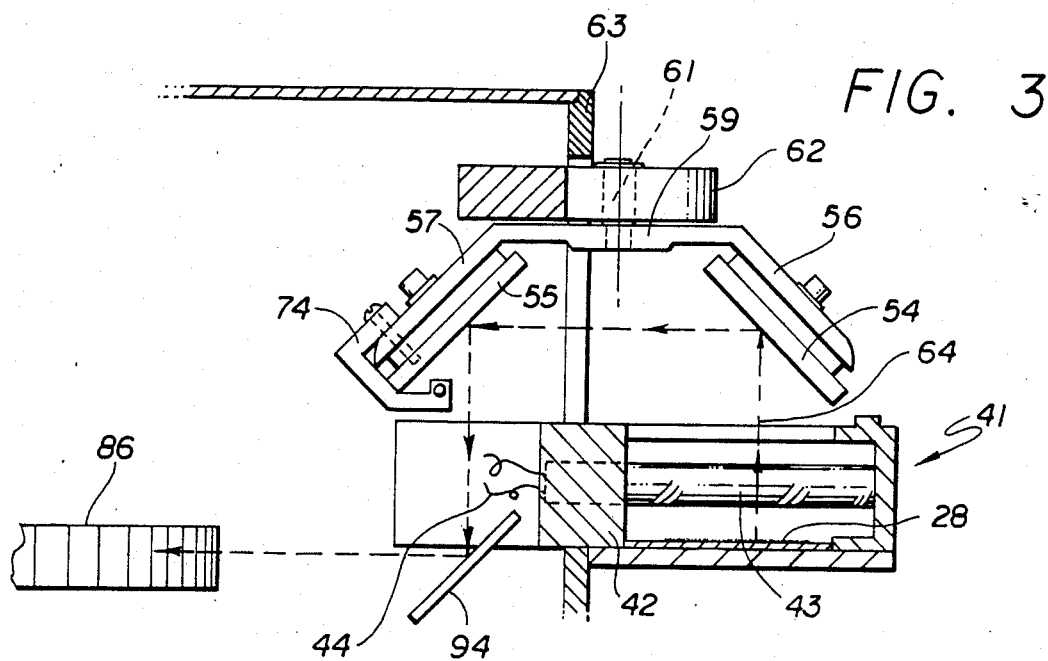
FIG. 3 is a sectional view taken on the line FIG. 3—3 of FIG. 2 showing the construction of the image-rotating mirror assembly.

As best seen in the cutaway view of FIG. 2, a take-up reel 18 mounted under the shelf and driven by a conventional pulse-driven step motor 19 draws a tape 21 of such treated paper from a spool 22. Suitable means, such as tensioned roller 23 acting in cooperation with a restraining brake in the spool mounting mechanism (not shown) maintains the tape 21 under tension. The tape 21 passes under, and is exposed through a port 27 in the shelf 14 where the individual print 28 is applied by having the individual touch a finger, previously moistened with the inkless solution, on the surface of the tape in the customary manner.

A slot 31 in the recessed face of the cabinet is adapted to receive a personal identification card 32 bearing the owner's fingerprint.

For purposes of identification the card 32 may also contain the bearer's photograph, address, and other indicia of identity. Of course, it may carry other information as well.

Guides 33 extending inwardly of the slot 31 receive the card 32 and, position it in the image plane of the optical projection system. Once the card 32 is seated, guides 33 restrain it against further movement. A removeable light-impervious housing 34 mounted to the front of the cabinet is adapted to enable the take-up mechanism to advance portion of the tape bearing the print 28 from the port 27 to a viewing station within the cabinet. A button 36 or other convenient switch means activates the take-up mechanism and simultaneously initiates the automatic identification cycle. If desired, the entire operation, including advancement of the tape to position print 28 at viewing station 35 and commencement of the identification cycle, could be triggered by a microswitch or other suitable means adapted to be activiated by insertion of card 32 into slot 29.

Figure 4:
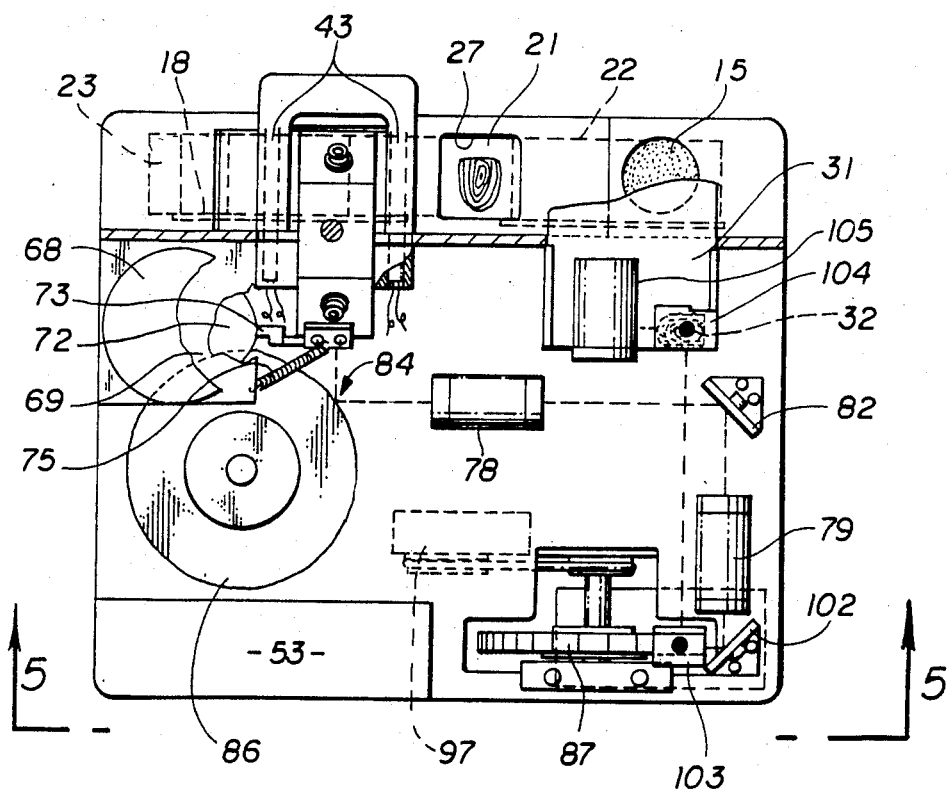
FIG. 4 is a top plan view of the device in FIG. 1 with the housing removed.
Figure 5:
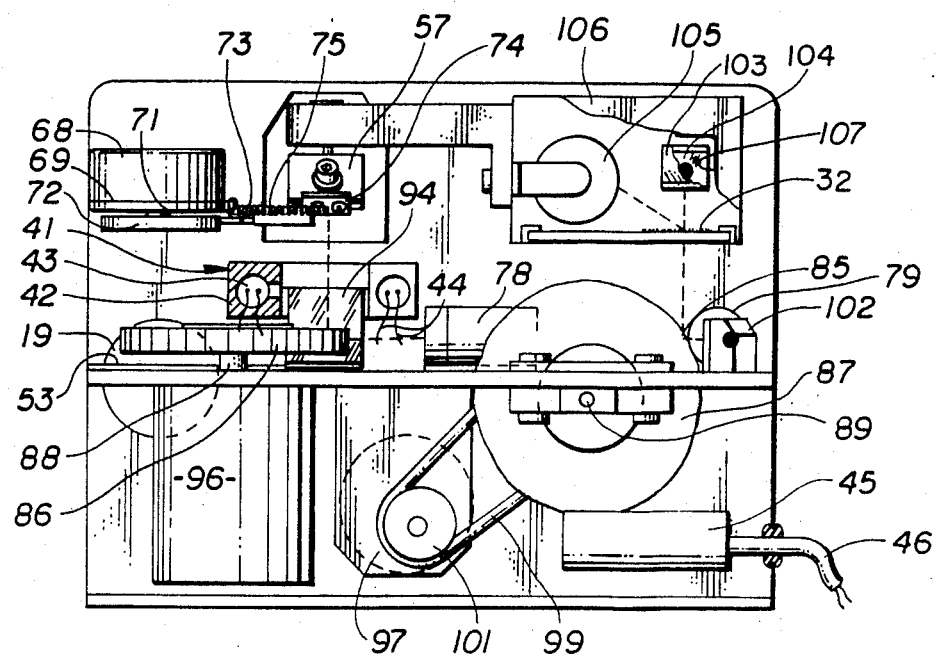
FIG. 5 is a rear elevational view of the device of FIG. 1 with the housing removed.
Figure 6:
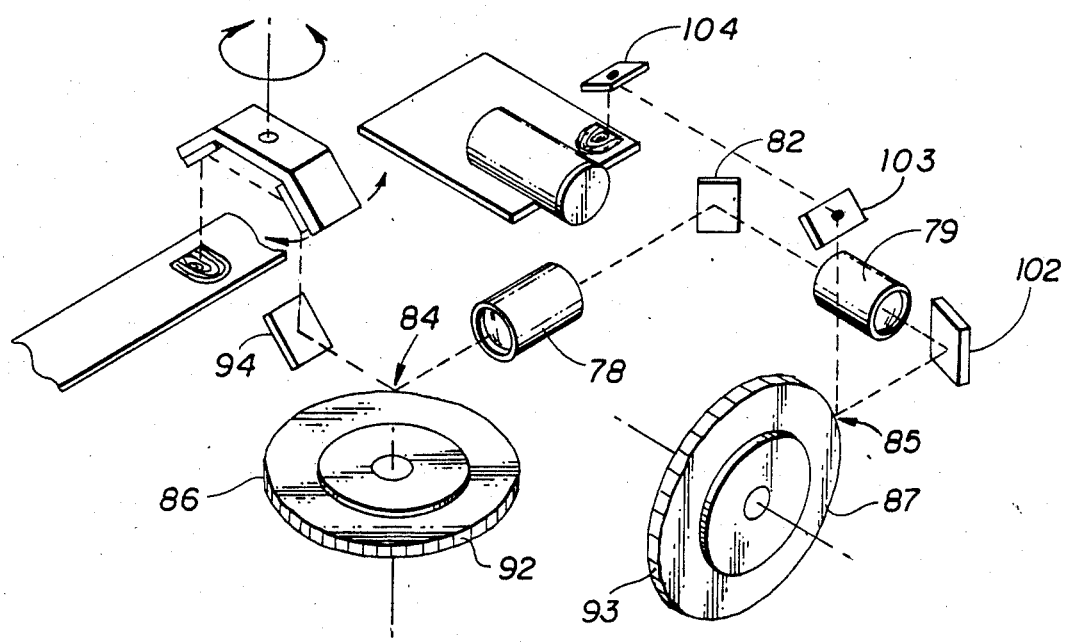
FIG. 6 is a perspective view of the optical system of the device of FIG. 1.

Turning to FIGS. 4 and 5, a lamp housing 41 is mounted astraddle viewing station 35. The housing 41 includes a pair of lamp holders 42 adapted to receive fluorescent lamps 43 operating in the high-audio frequency range, automotive-type line filament lamps, or other suitable sources of flickerless, incoherent light. The housing 41 and holder 42 are configured to distribute the radiance from lamps 43 evenly across the surface of the print 28 positioned at the viewing station 35.

The lamp leads 44 extend outwardly of the housing 41 and extend through appropriate circuitry to a power supply 45 deriving current from house current through a plug-in power cord 46. Preferably, all of the circuitry for operating the device is incorporated in one or more printed curcuit boards 53 for which convenient mounting means are provided on the chassis.

A pair of opposed mirrors 54, 55 supported in adjustable mirror mounts 56, 57 are secured to a rigid yoke 59. Mirrors 54, 55 are inclined at an angle of 45° from vertical and are symmetrical with respect to vertical shaft 61. Shaft 61 is attached to yoke 59 at a point equidistant from mirrors 54, 55 and is notatably journalled to mounting bracket 62 provided on chassis 63. Mirrors 54, 55 and yoke 59 comprise an optical image rotating mechanism of the invention.

Mirrors 54, 55 are located and oriented with respect to the print 28 and with respect to one another so that the incoming light rays constituting the optical image of print 28 (illustrated as broken line 64 for convenience) are received first by mirror 54 and are reflected by it into the second mirror 55. Mirror 55 in turn deflects the image downwardly in a path which is parallel to the path of the rays received by mirror 54 and spaced laterally from it. For the embodiment shown here, mirror 54 is located vertically above print 28, and the two parallel light paths are vertical.

A multi-pole cam motor 68 secured to a mounting bracket 69 on chassis 63 is connected through shaft 71 to a radial disk cam 72. Motor 68 rotates cam 72 at a rate of about 60 revolutions per minute. A cam follower, in this instance a nylon screw 73 adjustably threaded to a bracket 74 on mirror mount 57, is positioned to ride on the cam profile. Tension means, such as spring 75 connected to bracket 69 and bracket 74, maintain follower 73 in contact with cam 72.

The profile of cam 72 is designed to impart an oscillating rotary motion through about 8° of arc to yoke 59 with each revolution. By virtue of the geometry of the image rotating mechanism, the effect of this motion is to cause the optical image of a print 28 to rotate through an arc of about 16°, that is approximately 8° in each direction, around the principal axis of the light path 64 projected downwardly by mirror 55. A full 16° cycle takes about one second.

To provide for the use of rotating multifaceted mirrors to generate the sweep raster, a pair of independent self-correcting optical relay lens systems 78, 79 are mounted back to back in symmetry about a common interimage plane (not shown). With this arrangement if a thin sheet of paper were placed in the interimage plane, identical images simultaneously projected toward it through both of the lens systems would be visible, in focus, on either side of it. The specific design parameters for such systems are well known. In the preferrred embodiment each optical section 78, 79 is the equivalent of a microscope eye piece with about a 3 to 1 reduction between object and real image. By using a 3 to 1 reducing, and 1 to 3 enlarging image transformation, an effective 1 to 1 system magnification is obtained, with the interimage about ⅓ the size of the two fingerprints 28, 32 to be compared.

It will be noted that since the lens systems 78, 79 are mutually independent the image path connecting them may be deflected by various means, such as fixed mirror 82, with no significant adverse effect on the focus of the projected image. This flexibility allows the projection system to be "folded" to conform to space constraints and minimize the overall size of the apparatus. Preferably mirror 82 is not located precisely at the interimage position, but is displaced to one side or the other from it, so that any dust or foreign matter which might be on one of the reflective surfaces is not in focus.

Each of the optical lens systems 78, 79 has an aperture stop location 84, 85 spaced from its end remote from the interimage plane. A pair of similar regular prismatic multifaceted mirrors or "polygons" 86, 87 are mounted for rotation about mutually perpendicular shafts 88, 89. It will be understood that multifaceted polycones could be employed with the same result, however, their axes of rotation and the image projection optics hereinafter described would have to be modified accordingly.

The shafts 88, 89 are precisely located so that when the polygons 86, 87 are rotating, their planar highly-reflective facets 92, 93 pass through the aperture stop locations 84, 85 of their associated lens systems 78, 79. It will be noted and appreciated by those skilled in the art that while at the aperture stop locations 84, 85, each facet 92, 93 is the stop for its respective lens system 78, 79.

Constant-speed motors 96, 97 are provided to drive the two polygons 86, 87. The drive motors 96, 97 and their respective polygon-driving mechanisms may be of any conventional type suitable for driving polygons 86, 87 at constant speed. In the embodiment illustrated a direct drive through shaft 88 is utilized for the first polygon 86 in the optical projection train, and an indirect "O"-ring type drive belt 99 and a take-off pulley 101 mounted to the second motor 97 are used to drive the second polygon 87. If desired, the second motor could be relocated and the second polygon 87 mounted directly to the its shaft, thereby eliminating the pulley and belt drive.

I have arbitrarily chosen to utilize the first polygon 86 to produce a high-speed sweeping motion of the projected image along a first axis. Motor 96 turns polygon 86 at 3,600 revolutions per minute. For reasons I shall mention later, each of the polygons has 24 reflecting facets. Accordingly, 1,440 image-reflecting surfaces of polygon 86 pass through aperture stop location 84 each second.

The second polygon 87 is driven at approximately 0.024 times the speed of polygon 86 and deflects the projected image on a second axis transverse to the first axis about 35 times per second.

It should be noted at this juncture that while polygons 86, 87 and yoke 59 of the image rotating mechanism rotate at constant speed, they operate wholly independently of one another. Because of the extremely rapid sweep rate of the first polygon 86, no provision need be, or is, made for synchronizing the motion of either the polygons 86, 87 or the image rotation mechanism. This greatly simplifies the construction of the device and eliminates a major source of potential maintenance problems.

Returning to the image rotating mechanism, a fixed mirror 94 is positioned below the second mirror 55. This mirror 94 is oriented at an angle of 45° to the light path 64 projected downwardly by mirror 55 so as to deflect the entire image onto each of the facets 92 of the polygon 86 as the facet 92 coincides with the aperture stop location 84 of associated lens system 78.

Although each of the 24 facets 92 rotates through an arc of 15° about the axis of rotation of polygon 86, the facet 92 effectively "sees" the optical image of print 28 over an arc of only about 4°.

As a facet 92 of polygon 86 passes through this 4° arc, in addition to rotary motion around shaft 88, it simultaneously undergoes rotation in the plane of polygon 86 relative to the image path 64. This rotation of the reflective surface of facet 92 results in the optical image being deflected with a sweeping motion in the plane of polygon 86.

The moving image reflected by each facet 92 is directed through lens system 78 and onto previously mentioned mirror 82 oriented 45° to the incident light path. Mirror 82 reflects the focused image through the second lens system 79. Another 45° fixed mirror 102, positioned on the optical axis of lens system 79, deflects the image projected by lens system 79, again focused, onto the facets 93 of the second polygon 87 as they pass, successively, through the aperture stop location 85 of lens system 79.

In the manner previously described in connection with the operation of polygon 86, the facets of the second polygon 87 deflect the image with a sweeping motion in a plane transverse to the plane swept by facets 92, and, in turn, through a pair of fixed 45° mirrors 103, 104. Mirror 104 is positioned to superimpose the focused image on print 32 in the surface of identification card 31 previously inserted in slot 29 and retained in the image plane by guides 33.

As depicted fancifully in FIG. 7, the image 109 superimposed on print 32 traces a pattern synthesized by the interaction of the optical image rotating mechanism and the two rotating multifaceted mirrors polygons 86, 87.

The sweeping motion imparted to the optical image 109 by facets 92, 93 of the rotating polygons 86, 87 begins with the initial interception of the incident light rays by each facet 92, 93. The sweep ends when that facet 92, 93 is no longer in the image path. Since the facets 92, 93 in each polygon 86, 87 are contiguous, and the rotation of the polygons 86, 87 is at constant speed and always in the same direction, the raster produced by the interaction of facets 92, 93 is in the form of a succession of sloped paths 111 having no visible retrace connecting their extremities. The paths 111 sweep the raster in the direction indicated by arrows 112, and successive paths 111 move across the image of print 32 in the direction indicated by arrow 113.

As mentioned earlier, during each scan frame the image 109 of print 28 is constantly rotating in the image plane. The angular orientation of image 109, $\theta$, varies from 8° on one side of an arbitrary base path 115 to 8° on the opposite side of that path. The extremely fast sweep rate of polygon 86 insures that no point in the relatively slowly rotating image 109 moves more than one resolution increment within the period of one sweep path 111.

To sense the radiance produced by the interaction of the features of the image 109 of print 28 with the features of print 32, a photomultiplier or other suitable photodetector 105 is mounted to the chassis 63, with its photocathode window positioned and oriented to maximize the photodetector's response to the light energy reflected from the area of the surface of the card 31 containing print 32.

To insure that photodetector 105 is responsive only to the radiance resulting from the interplay of the features of image 28 and print 32, and not to ambient light, preferably, the card 31 and photodetector 105 are contained within a light shielding enclosure 106. Optical access into enclosure 106 is provided through a port 107 positioned in the light path between mirrors 103, 104.

As the illuminated image 109 is swept across exemplary fingerprint 32, the interaction of the features of the respective prints 28, 32 causes the intensity of the reflected light sensed by photodetector 105, and thus the electrical output signal of photodetector 105, to vary continuously.

While the image 109 is being swept over print 32, unless and until the two sets of features match, the reflected radiance sensed by photodetector 105 is random. When the features match, the radiance intensity increases sharply. Electronic signal processing circuitry is provided, for example in printed circuit board 53, for enhancing this characteristic response. This circuitry, typically embodying low-noise preamplification, high-pass filtering, and automatic gain control capacity, serves to suppress and filter out spurious signals and background noise and extract the desired correlation signal, if and when it occurs. Such circuitry is well known.

FIG. 8 is a fanciful depiction of the processed signal 121 showing an enhanced correlation pulse 122 representing the increased radiance produced by the juxtaposition of the features of matching image 109 and print 32.

By setting a threshold 123 at some level well above the random output background, a signal may be provided to indicate a positive identification or lack of it.

Figure 9:
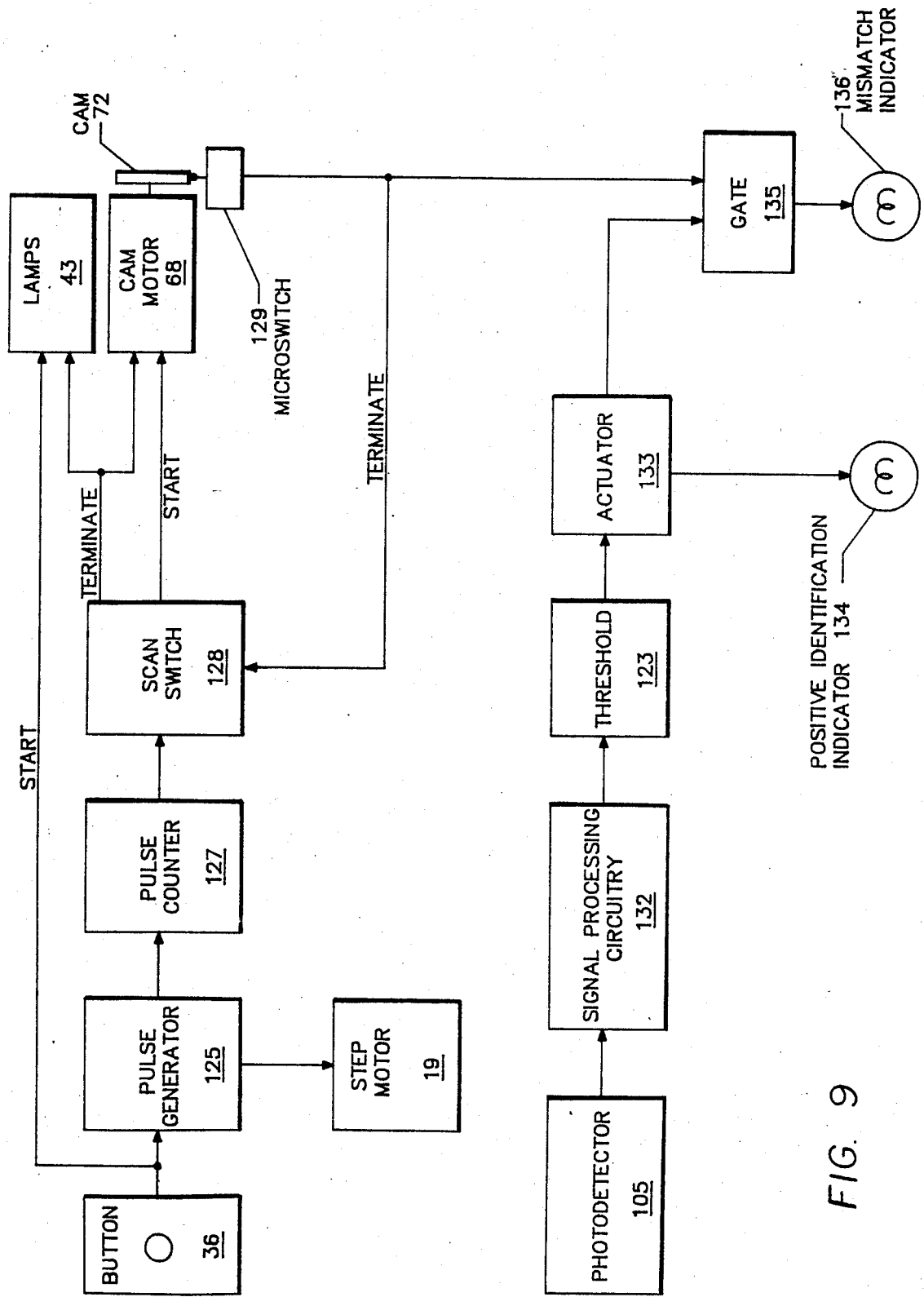
FIG. 9 is a block diagram illustrating the principal features of the electrical circuitry of the device of FIG. 1.

For a better understanding of the operation of the device, reference is made to the block diagram of FIG. 9.

Prior to use, the device is powered up and polygon motors 96, 97 brought to operating speed. Because of their mass, motors 96, 97 are run continuously. When an identification is to be made, the individual to be identified imprints his or her fingerprint on tape 21 in the manner previously described, inserts his or her identification card 31 in slot 29, and actuates the activating means, here button 36.

As illustrated in FIG. 9, depressing button 36 activates fluorescent lamps 43 and a pulse generator 125, sending a predetermined number of pulses to step motor 19. Step motor 19 and tape drive mechanism 126 advance tape 21 to position fingerprint 28 in the viewing station 35.

A pulse counter 127 responsive to pulse generator 125 sends a signal to scan switch 128, indicating that the print 28 is in position for scanning print 32. Scan switch 128 activates cam motor 68, thereby initiating the image-sweeping cycle.

I have found it advantageous to commence each sweep cycle with the image rotating mechanism in a predetermined starting position. Accordingly, I have provided a microswitch 129, operated by the profile of cam 72, to indicate the return of yoke 59 to the position shown in FIGS. 4 and 5. On receipt of this signal, scan switch 128 deactivates lamps 43 and cam motor 68.

During the scanning cycle signal processing circuitry 132 continuously processes the output of photodetector 105. If, during the cycle the output of signal processing circuitry 132 exceeds the limit previously established for threshold 123, an actuator 133 activates a positive identification indicator, for example green lamp 134.

If positive identification has not been made by the end of the comparison cycle, signals from microswitch 129 and actuator 133 activate a gate 135 to turn on a mismatch indicator, such as red lamp 136.

Following the completion of the comparison cycle the positive identification indicator 134 or mismatch indicator 135 remains illuminated until card 31 is removed.

A critical analysis of the geometry of the optical projection system of the invention will disclose that as each of the facets 92, 93 of polygons 86, 87 passes through the aperture stop location of its associated lens system 78, 79, it undergoes slight movement axially of the optical image path 64. To insure that such movement does not cause the image 109 to exceed the limits of the focused field of the system, the size the polygons 86, 87 and the number of facets 92, 93 must be taken into account. By way of example, clearly with a polygon having only three or four facets, the excursion of the reflective surfaces in the light path would defocus the image impinging on the exemplary print.

As a rough rule of thumb, the depth of focus of most lens systems suitable for use in a device embodying my invention will be adequate to accomodate polygons with eight or more reflective surfaces.

As a practical matter, the need for each facet to be of a reasonable optical f-number, that is, high enough to afford sufficient space to include the image rotating mechanism and the rotating polygons, and low enough to insure that the photodector receives sufficient illumination to discriminate between the correlation signal and dark current background noise, effectively determines the overall dimensions of the polygons. In the embodiment illustrated here, the 24-faced polygons 86, 87 are approximately three inches in diameter.

Although I have described my invention in terms of a preferred embodiment with several specific alternative features, it is not to be construed as limited to that embodiment and those features. They are to be regarded as illustrative rather than restrictive. It is my intention by this specification to include any and all variations of the examples I have chosen for purposes of the disclosure, which do not depart from the spirit and scope of the following claims.

I claim:

1. A fingerprint identification device for rapid automatic comparison of a latent fingerprint with a known fingerprint, comprising:
   a light source illuminating said latent print;
   optical projection means interposed between said fingerprints projecting the image of said latent fingerprint in an optical path and superimposing said image on said known fingerprint, said optical projection means including:
   a pair of independent coaxial image forming lenses symmetrically disposed with respect to a common intermediate image plane, each of said lenses having an aperture stop location associated therewith, optical deflection means positioned at each of said aperture stop locations causing said image to traverse said known fingerprint in a repeating pattern, and optical rotation means effectively rotating said image in said optical path;

sensing means positioned adjacent said known fingerprint, said sensing means being responsive to the radiance produced by the interaction of said image with said known fingerprint and emitting an electrical signal representative of said radiance;

signal processing means connected with said sensing means comparing said signal with a preestablished correlation signal threshold; and indicator means responsive to said signal processing means and actuated thereby when said signal exceeds said threshold to indicate the matching of said fingerprints.

2. The fingerprint identification device of claim 1, wherein said optical deflection means comprise a pair of polygonal multifaceted mirrors rotating about mutually perpendicular axes, the reflecting facets of each of said mirrors successively coinciding with one of said aperture stop locations.

3. The fingerprint identification device of claim 2, wherein said optical rotation means comprise a pair of spaced opposed mirrors ganged together in a supporting yoke, the first of said mirrors deflecting said image onto the second thereof and the second thereof reflecting said image in a direction, said yoke rotating about an axis intermediate said mirrors oriented parallel with said direction.

4. The fingerprint identification device of claim 3, comprising drive means causing said multifaceted mirrors and said ganged mirrors to rotate in timed relationship.

5. The fingerprint identification device of claim 4, comprising holding means supporting said fingerprints in stationary relationship.

6. The fingerprint identification device of claim 5, wherein the holding means supporting said latent fingerprint comprises:

a continuous tape for receiving a plurality of latent fingerprints; and transport means positioning selected ones of said latent fingerprints for comparison with a selected known fingerprint.

7. Optical projection means for superimposing the image of a latent fingerprint on a known fingerprint in a fingerprint identification device, comprising:

a pair of independent, coaxial image forming lenses symetrically disposed with respect to a common intermediate image plane, each of said lenses having an aperture stop location associated therewith;

optical deflection means positioned at each of said aperture stop locations causing said image to traverse said known fingerprint in a repeating pattern; and optical rotation means effectively rotating said image in said optical path.

8. The optical projection means of claim 7, wherein said optical deflection means comprise a pair of polygonal multifaceted mirrors rotating about mutually perpendicular axes, the reflecting facets of each of said mirrors successively coinciding with one of said aperture stop locations.

9. The optical projection means of claim 8, wherein said optical rotation means comprise a pair of spaced mirrors reversing the direction of said optical path, said mirrors being ganged together and rotating about a common intermediate axis oriented parallel with said direction.

10. The optical projection means of claim 9, comprising drive means causing said multifaceted mirrors and said ganged mirrors to rotate in timed relationship.

* * * * *